(12) United States Patent
Ko et al.

(10) Patent No.: US 10,864,868 B2
(45) Date of Patent: Dec. 15, 2020

(54) TUBE-HOLDING DEVICE FOR VEHICLE

(71) Applicants: HYUNDAI MOTOR COMPANY, Seoul (KR); KIA MOTORS CORPORATION, Seoul (KR)

(72) Inventors: Hyun Ko, Anyang-si (KR); Chang Ho Ham, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 180 days.

(21) Appl. No.: 15/830,805

(22) Filed: Dec. 4, 2017

(65) Prior Publication Data

US 2018/0334120 A1    Nov. 22, 2018

(30) Foreign Application Priority Data

May 18, 2017   (KR) .......................... 10-2017-0061351

(51) Int. Cl.
| | | |
|---|---|---|
| *B60R 16/08* | (2006.01) | |
| *B60R 16/023* | (2006.01) | |
| *F16L 5/00* | (2006.01) | |
| *F16L 3/223* | (2006.01) | |
| *F16L 3/237* | (2006.01) | |
| *F16L 5/02* | (2006.01) | |

(Continued)

(52) U.S. Cl.
CPC ............ *B60R 16/08* (2013.01); *B60R 16/023* (2013.01); *F16L 3/2235* (2013.01); *F16L 3/237* (2013.01); *F16L 5/00* (2013.01); *F16L 5/027* (2013.01); *F16L 5/14* (2013.01); *H02G 3/0658* (2013.01)

(58) Field of Classification Search
CPC .......... B60R 16/08; B60R 16/023; F16L 5/00; F16L 3/237; F16L 3/2235; F16L 5/14; F16L 5/027; F16L 3/10; F16L 3/13; F16L 5/10; H02G 3/0658; H02G 3/0633; H02G 3/0683; H02G 3/22; H02G 3/086; H02G 3/081; H02G 3/08; H02G 3/00; H02G 3/02; H02G 3/04; H02G 3/06; H02G 3/0625; H02G 3/0616
USPC ...................... 248/67.5, 27.1, 27.3, 56, 68.1; 174/153 G, 68.1, 68.3, 135, 650, 652, 174/653, 656, 664; 220/4.02, 3.94, 3.92, 220/3.3
See application file for complete search history.

(56) References Cited

U.S. PATENT DOCUMENTS

| | | | | |
|---|---|---|---|---|
| 2,424,758 A | * | 7/1947 | Klumpp, Jr. .............. | F16L 5/00 174/153 G |
| 2,424,759 A | * | 7/1947 | Klumpp, Jr. ......... | H02G 3/0675 174/153 G |

(Continued)

FOREIGN PATENT DOCUMENTS

| | | |
|---|---|---|
| JP | 2011-072164 A | 4/2011 |
| KR | 20-0275868 Y1 | 5/2002 |

(Continued)

*Primary Examiner* — Ingrid M Weinhold
(74) *Attorney, Agent, or Firm* — Morgan, Lewis & Bockius LLP

(57) ABSTRACT

A vehicular tube-holding device includes an outer holder mounted to a vehicle body, the outer holder having an inner holder fastening hole for insertion and fastening of an inner holder and a tube-fixing hole for passage of a tube; and the inner holder inserted into and fastened to the inner holder fastening hole in the outer holder to be in close contact with an outer-diameter portion of the tube.

5 Claims, 7 Drawing Sheets

(51) Int. Cl.
*F16L 5/14* (2006.01)
*H02G 3/06* (2006.01)

(56) References Cited

U.S. PATENT DOCUMENTS

| | | | | | |
|---|---|---|---|---|---|
| 2,930,840 A | * | 3/1960 | Klumpp, Jr. | ......... | H02G 3/0633 174/153 G |
| 2,974,186 A | * | 3/1961 | Klumpp, Jr. | ....... | H01R 13/5816 16/2.2 |
| 3,141,062 A | * | 7/1964 | Rapata | ...................... | F16L 5/00 174/153 G |
| 3,424,856 A | * | 1/1969 | Coldren | ............... | H02G 3/0633 16/2.5 |
| 3,866,870 A | * | 2/1975 | Nicholson | ................. | F16L 5/00 174/153 G |
| 3,906,592 A | * | 9/1975 | Sakasegawa | ......... | F16L 3/1233 24/487 |
| 3,953,665 A | * | 4/1976 | Nicholson | ................. | F16L 5/00 174/153 G |
| 4,002,821 A | * | 1/1977 | Satoh | ................... | H02G 3/0658 16/2.5 |
| 4,002,822 A | * | 1/1977 | Kurosaki | ............. | H02G 3/0658 16/2.5 |
| 4,029,896 A | * | 6/1977 | Skinner | ................. | F24C 15/104 174/138 F |
| 4,077,085 A | * | 3/1978 | Yuda | .................... | H02G 3/0658 16/2.1 |
| 4,118,838 A | * | 10/1978 | Schiefer | .................... | F16L 3/10 24/115 R |
| 4,431,152 A | * | 2/1984 | Reed, Jr. | .............. | H02G 3/0683 248/65 |
| 4,646,995 A | * | 3/1987 | Matsui | ................. | H02G 3/0641 174/153 G |
| 4,899,964 A | * | 2/1990 | Sick | .................... | F16B 37/0842 24/459 |
| 4,981,444 A | * | 1/1991 | Willmott | .............. | H01R 13/595 174/153 G |
| 5,243,139 A | * | 9/1993 | Law | ........................ | H02G 3/22 174/135 |
| 5,675,128 A | * | 10/1997 | Simon | ................... | F16L 3/1033 174/135 |
| 6,868,580 B1 | * | 3/2005 | Diggs | .................. | F16L 3/2332 16/2.1 |
| 7,005,579 B2 | * | 2/2006 | Beele | ....................... | F16L 5/10 16/2.1 |
| 7,273,986 B2 | * | 9/2007 | Fuller | ................. | B60R 16/0222 174/151 |
| 7,387,282 B2 | * | 6/2008 | Kovac | ................. | B60R 16/0215 248/55 |
| 7,464,966 B2 | * | 12/2008 | Miyajima | ................. | F16L 5/10 285/124.3 |
| 8,430,365 B2 | * | 4/2013 | Benoit | ..................... | F16L 5/14 248/49 |
| 2010/0307817 A1 | * | 12/2010 | Roy | ....................... | H02G 3/185 174/666 |
| 2016/0076689 A1 | * | 3/2016 | Kato | ..................... | F16L 55/035 248/636 |
| 2017/0314706 A1 | * | 11/2017 | Krohn | ................. | B60R 16/0215 |

FOREIGN PATENT DOCUMENTS

| | | |
|---|---|---|
| KR | 20-2009-0006346 U | 6/2009 |
| KR | 10-1653576 B1 | 9/2016 |

* cited by examiner

[FIG. 1]
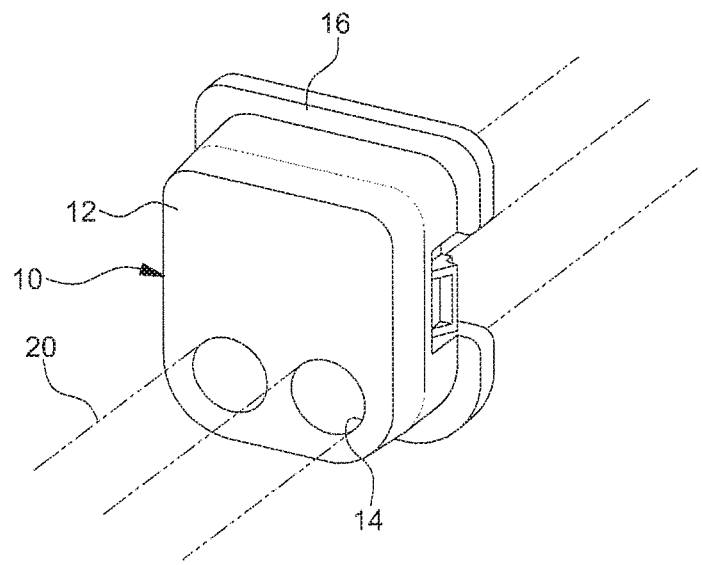
-PRIOR ART-
[FIG. 2]
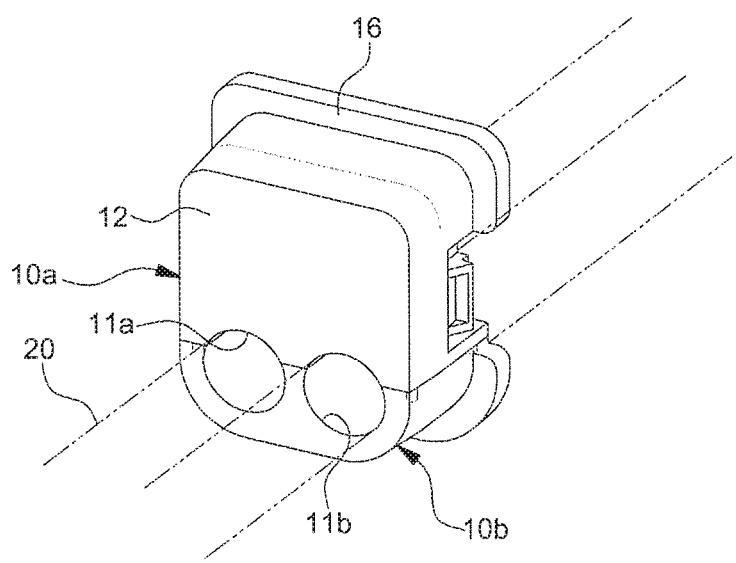
-PRIOR ART-

[FIG. 3]
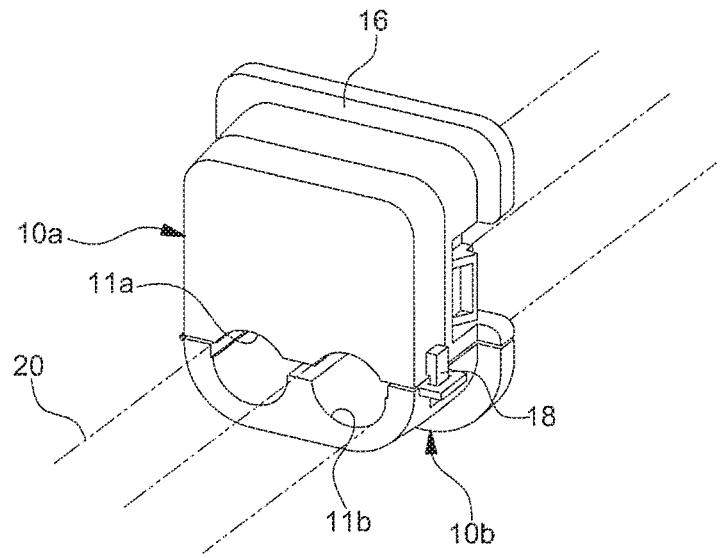
-PRIOR ART-
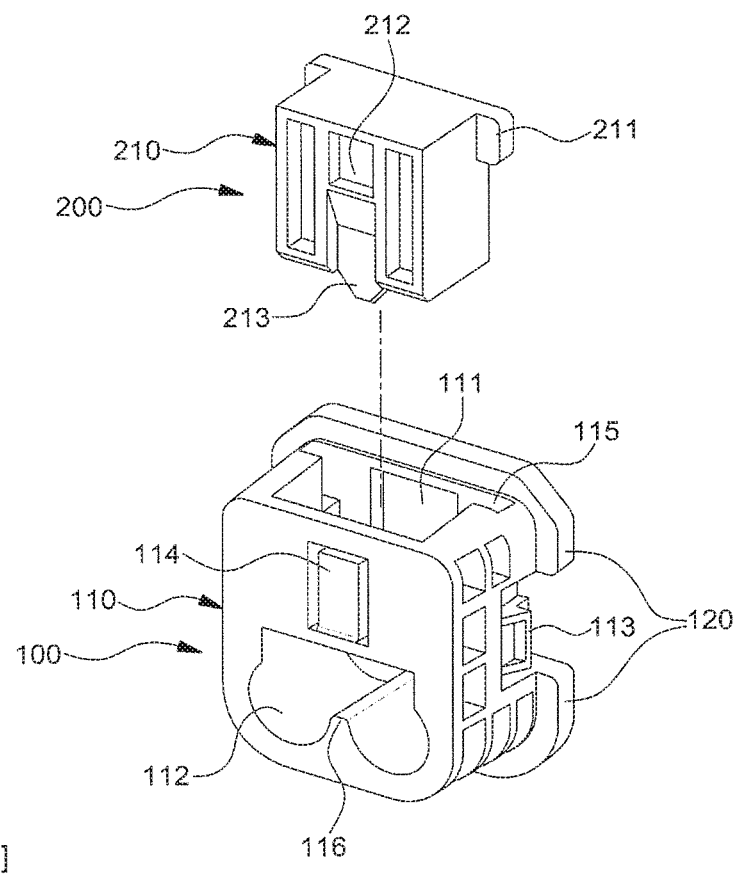
[FIG. 4]

[FIG. 5]
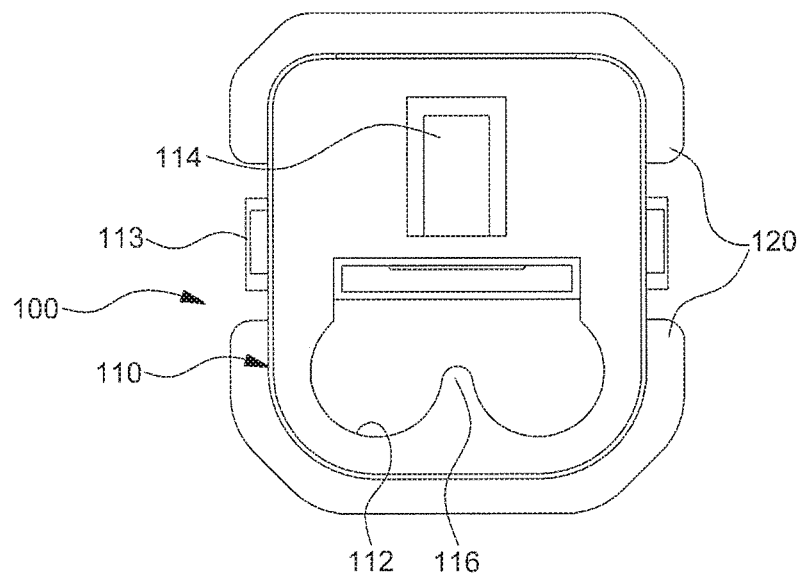
[FIG. 6]
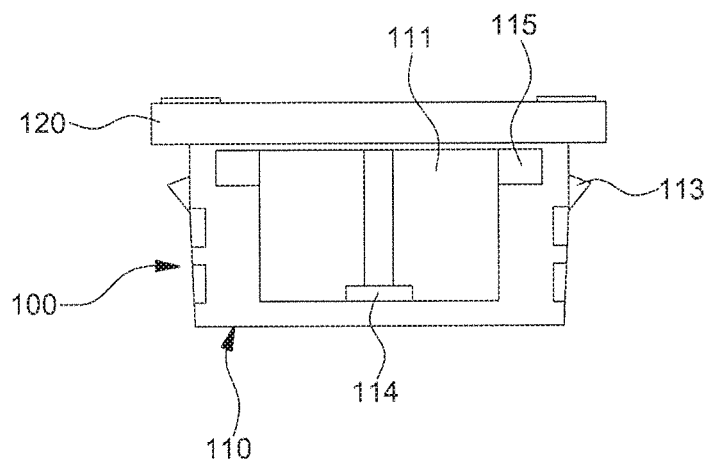

[FIG. 7]
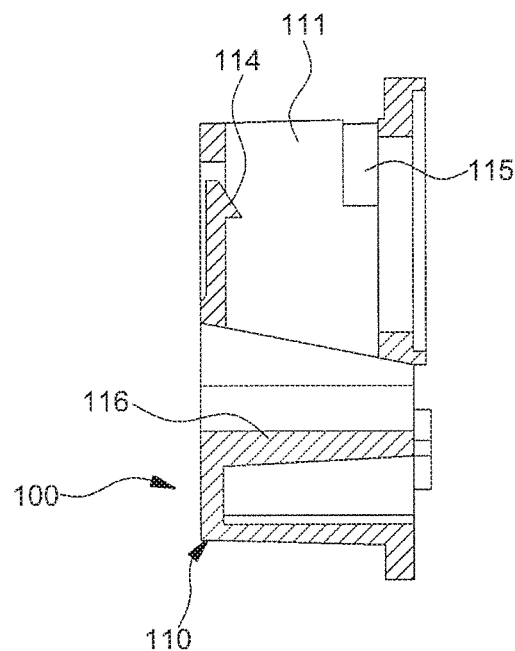
[FIG. 8]
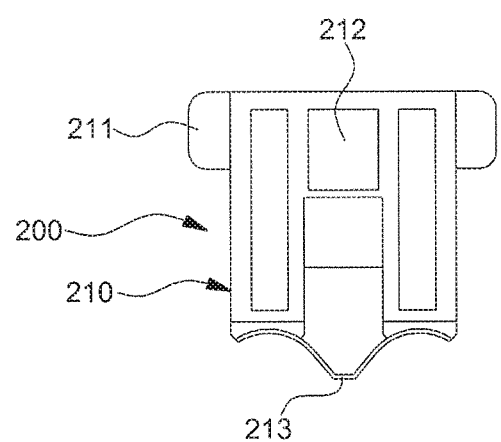

[FIG. 9]
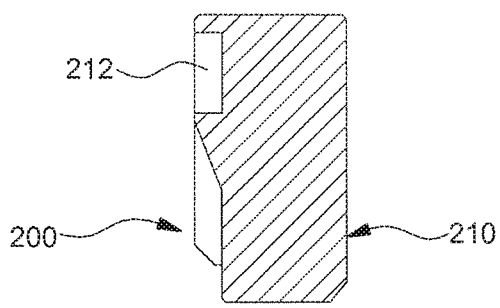
[FIG. 10]
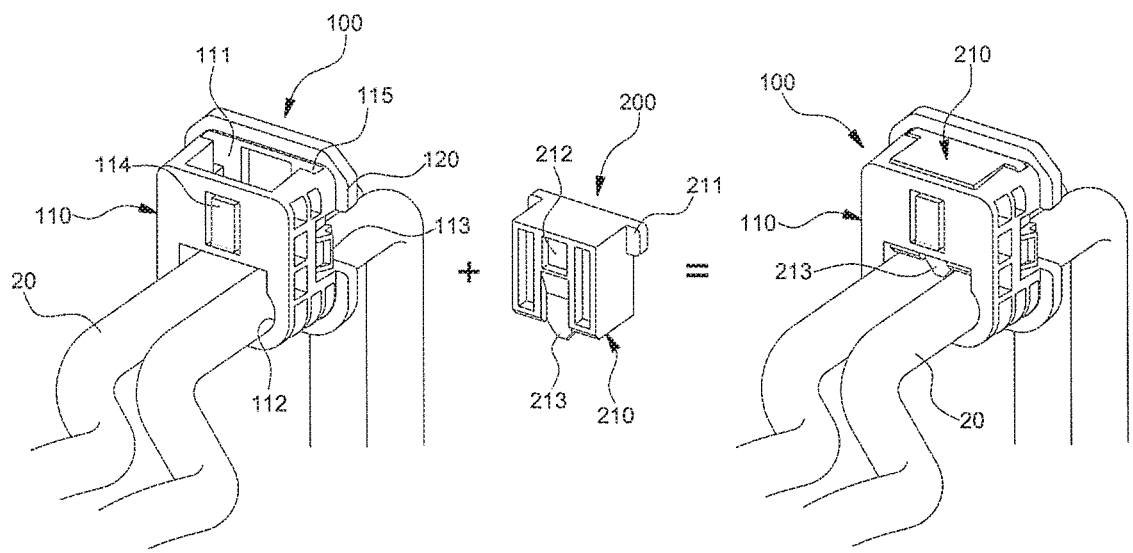

[FIG. 11]
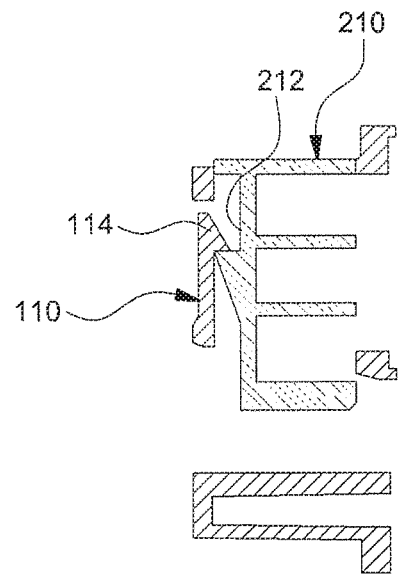
[FIG. 12]
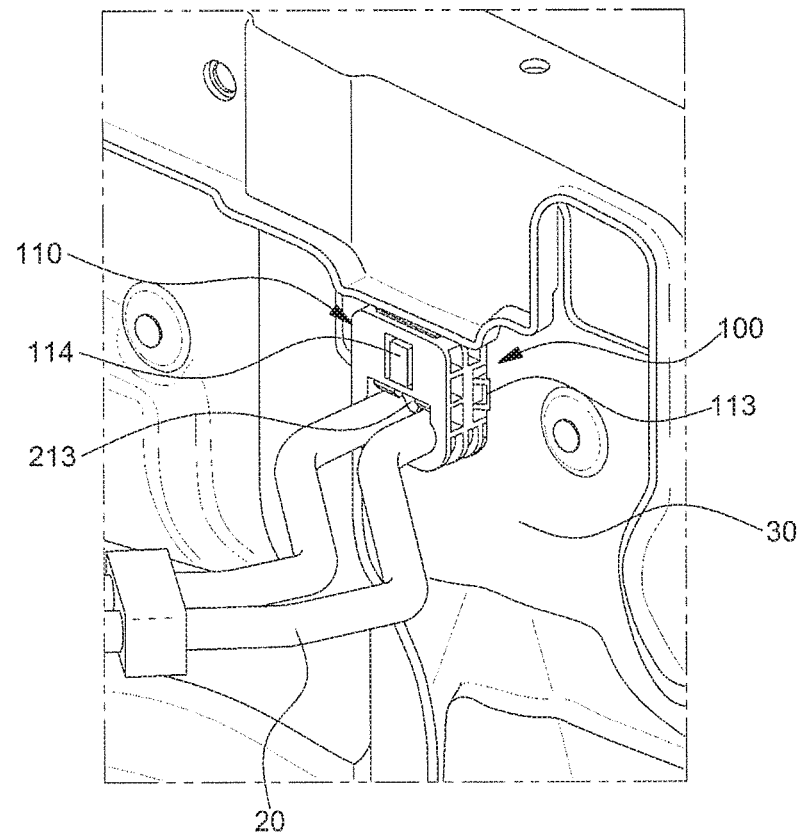

[FIG. 13]
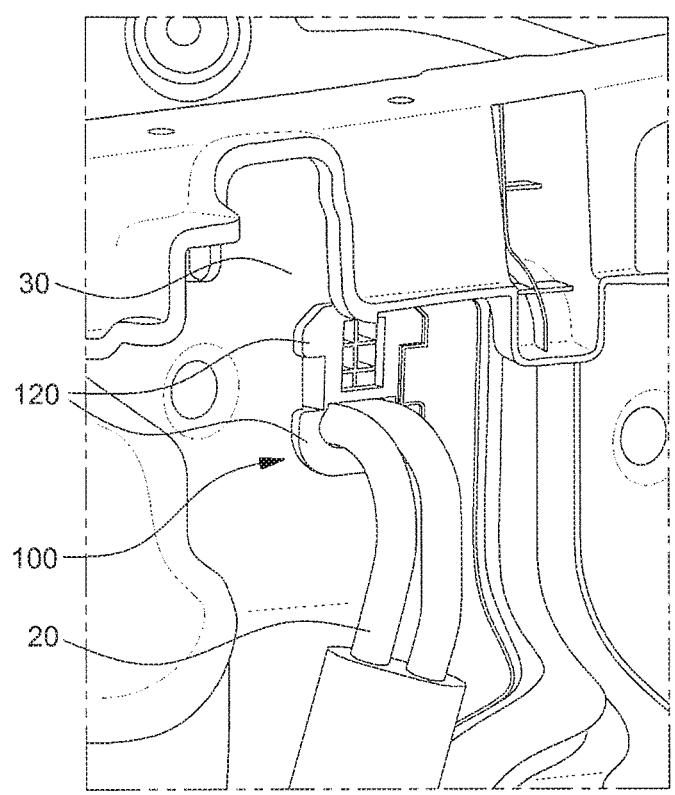

TUBE-HOLDING DEVICE FOR VEHICLE

CROSS-REFERENCE TO RELATED APPLICATION

This application claims under 35 U.S.C. § 119(a) the benefit of priority to Korean Patent Application No. 10-2017-0061351 filed on May 18, 2017, the entire content of which is incorporated herein by reference.

TECHNICAL FIELD

The present disclosure relates to a vehicular tube-holding device, and more particularly, to a vehicular tube-holding device which is mounted on such as a partition of an engine room to firmly fix, for example, a tube or a cable.

BACKGROUND

As is well known, an engine room and unseen inner spaces in a vehicle are connected via various tubes, cables and the like for fluid exchange, electric signal exchange and the like between various elements.

For example, both a fuel supply line that supplies fuel from a fuel tank to an engine and a brake line that transmits braking hydraulic pressure from a master cylinder to a wheel cylinder are provided in a tube form.

In particular, the tubes and the like extend through a vehicle body in order to interconnect elements, and thus need to be stably secured to the vehicle body in order to prevent movement, sagging and the like due to vehicle driving vibrations or external forces.

To this end, such a tube is firmly secured to the vehicle body using a separate tube holder.

Here, a conventional tube holder will be described below.

A tube holder 10 according to a conventional example, as illustrated in FIG. 1, includes a holder body 12 having two or more tube-fixing holes 14 for the penetration and insertion of a tube 20 and a mount 16 integrally formed on the rim portion of the holder body 12 and attached to the vehicle body using, for example, a bolt or a stud (not illustrated).

However, in the tube holder 10 according to the conventional example, each tube-fixing hole 14 formed in the holder body 12 has a predetermined diameter. Therefore, when the diameter of the tube 20 is greater than the diameter of the tube-fixing hole 14, the tube 20 may not be smoothly inserted into the tube-fixing hole 14 due to friction between the outer-diameter surface of the tube 20 and the inner-diameter surface of the tube-fixing hole 14, which causes deterioration in productivity and workability due to the difficulty of tube assembly work.

On the other hand, when the diameter of the tube 20 is smaller than the diameter of the tube-fixing hole 14, the tube 20 inserted into the tube-fixing hole 14 may not be correctly fixed, and the tube 20 may be moved due to, for example, vehicle driving vibrations, which causes deformation in the layout of tubes.

A tube holder according to another conventional example, as illustrated in FIG. 2, has a separable configuration in which an upper holder 10a having a semicircular first tube-fixing hole 11a and a lower holder 10b having a semicircular second tube-fixing hole 11b are separated from each other.

A tube holder according to a further conventional example, as illustrated in FIG. 3, has an opening/closing configuration in which the upper holder 10a having the semicircular first tube-fixing hole 11a and the lower holder 10b having the semicircular second tube-fixing hole 11b are connected to each other via a hinge and are fastened to each other via a clip structure 18.

However, the tube holder according to the other conventional example is problematic because the upper holder 10a and the lower holder 10b need to be separately attached to the vehicle body, which causes deterioration in workability and productivity. In addition, because a tube-fixing hole is divided into the first tube-fixing hole 11a and the second tube-fixing hole 11b, a tube may not be firmly fixed unless the respective fixing holes 11a and 11b are accurately aligned with each other to define a circle.

In addition, the tube holder according to the further conventional example may cause separation of a tube when the hinge or the clip structure 18 that interconnects the upper holder 10a and the lower holder 10b is damaged.

SUMMARY OF THE DISCLOSURE

The present disclosure is devised in consideration of the above description and an object of the present disclosure is to provide a vehicular tube-holding device in which a holder for fixing a tube includes an outer holder mounted to a vehicle body and an inner holder inserted into and fastened to the outer holder, so as to enable easy tube assembly work and to prevent movement of a tube via firm tube fixing.

In one aspect, a vehicular tube-holding device includes an outer holder mounted to a vehicle body, the outer holder having an inner holder fastening hole for insertion and fastening of an inner holder and a tube-fixing hole for passage of a tube, and the inner holder inserted into and fastened to the inner holder fastening hole in the outer holder to be in close contact with an outer-diameter portion of the tube.

The outer holder may include a first body having the inner holder fastening hole for insertion and fastening of the inner holder formed in an upper portion thereof so as to penetrate in a vertical direction and the tube-fixing hole for passage of the tube formed in a lower portion thereof so as to penetrate in a front-and-rear direction, vehicle body coupling hooks formed on opposite side surfaces of the first body, and a vehicle-body close-contact mount integrally formed on a rear surface of the first body.

The first body may have an inner holder fastening hook formed on a front surface thereof so as to protrude toward the inner holder fastening hole.

The first body may have a slide groove formed in an upper surface thereof for fastening of the inner holder at a boundary between the inner holder fastening hole and the vehicle-body close-contact mount.

The tube-fixing hole may be provided with a tube seat protruding upward from a middle portion of a bottom thereof so as to allow two or more tubes to be separately seated.

The inner holder may include a second body configured to be inserted into the inner holder fastening hole in the outer holder and sliders formed on opposite side surfaces of the second body so as to be inserted into and fastened to a slide groove in the outer holder.

The second body may have a fastening recess formed in a front surface thereof, into which an inner holder fastening hook of the outer holder is fastened.

The second body may have a tube close-contact protrusion integrally formed on a lower surface thereof at a position at which the tube close-contact protrusion and a tube seat of the outer holder face each other so that tube close-contact protrusion is in close contact with and presses the tube.

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a perspective view illustrating a tube holder according to a conventional example;

FIG. 2 is a perspective view illustrating a tube holder according to another conventional example;

FIG. 3 is a perspective view illustrating a tube holder according to a further conventional example;

FIG. 4 is an exploded perspective view illustrating a vehicular tube-holding device according to an embodiment of the present disclosure;

FIG. 5 is a front view illustrating an outer holder of the vehicular tube-holding device according to an embodiment of the present disclosure;

FIG. 6 is a plan view illustrating the outer holder of the vehicular tube-holding device according to an embodiment of the present disclosure;

FIG. 7 is a cross-sectional view illustrating the outer holder of the vehicular tube-holding device according to an embodiment of the present disclosure;

FIG. 8 is a front view illustrating an inner holder of the vehicular tube-holding device according to an embodiment of the present disclosure;

FIG. 9 is a cross-sectional view illustrating the inner holder of the vehicular tube-holding device according to an embodiment of the present disclosure;

FIG. 10 is a perspective view illustrating the process of assembling the vehicular tube-holding device according to an embodiment of the present disclosure;

FIG. 11 is a cross-sectional view illustrating the coupled state of the outer holder and the inner holder of the vehicular tube-holding device according to an embodiment of the present disclosure; and FIGS. 12 and 13 are perspective views illustrating the state in which the vehicular tube-holding device according to an embodiment of the present disclosure is mounted to a vehicle body panel.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, the exemplary embodiments of the present disclosure will be described in detail with reference to the accompanying drawings.

FIG. 4 is an exploded perspective view illustrating a vehicular tube-holding device according to the present disclosure.

As illustrated in FIG. 4, a tube-holding device according to an embodiment of the present disclosure includes an outer holder 100 mounted to a vehicle body and an inner holder 200 inserted into and fastened to the outer holder 100.

More specifically, the tube-holding device of the present disclosure includes the outer holder 100 mounted to the vehicle body, the outer holder 100 having an inner holder fastening hole 111 formed in an upper portion thereof so that the inner holder 200 is inserted into and fastened to the inner holder fastening hole 111 and a tube-fixing hole 112 formed in a lower portion thereof so that a tube passes through the tube-fixing hole 112, and the inner holder 200 inserted into and fastened to the inner holder fastening hole 111 in the outer holder 100 so as to be in close contact with the outer-diameter portion of the tube.

Here, the configuration of the outer holder of the tube-holding device according to the present disclosure will be described below in more detail with reference to FIGS. 5 to 7.

The outer holder 100 includes, as a framework, a first body 110, and a vehicle-body close-contact mount 120 integrally formed on the rim of the rear surface of the first body 110 so as to be in close contact with the vehicle body (e.g. a partition of an engine room).

The first body 110 has a rectangular block shape. The inner holder fastening hole 111 for the insertion and fastening of the inner holder 200 is formed in the upper portion of the first body 110 so as to penetrate in the vertical direction, and the tube-fixing hole 112 for the passage of a tube is formed in the lower portion of the first body 110 so as to penetrate in the front-and-rear direction.

In addition, hooks 113 for vehicle body coupling are integrally formed on opposite side surfaces of the first body 110.

In addition, an inner holder fastening hook 114 is integrally formed on the front surface of the first body 110 so as to protrude toward the inner holder fastening hole 111.

More specifically, when outward force is applied to the inner holder fastening hook 114 from the inner side, the inner holder fastening hook 114 is biased outward with the elasticity thereof, and then returns to the original position thereof with the elastic restoration thereof when the force is removed.

In addition, a slide groove 115 is formed in the upper surface of the first body 110 at the boundary between the inner holder fastening hole 111 and the vehicle-body close-contact mount 120 in order to limit the insertion/fastening depth of the inner holder 200.

In addition, the tube-fixing hole 112, which is formed in the front-and-rear direction in the lower portion of the first body 110, has a configuration in which two tube penetration holes communicate with each other to allow two or more tubes to be seated therein. A tube seat 116 protrudes upward from a middle portion of the bottom of the tube-fixing hole 112 so as to allow two or more tubes to be separately seated.

Here, the configuration of the inner holder of the tube-holding device according to the present disclosure will be described below in more detail with reference to FIGS. 8 and 9.

The inner holder 200 has a rectangular block shape, and includes, as a framework, a second body 210 inserted into and fastened to the inner holder fastening hole 111 in the outer holder 100.

Sliders 211 are integrally formed on opposite side surfaces of the second body 210 so as to be inserted into and fastened to the slide groove 115 formed in the first body 110 of the outer holder 100.

In addition, a fastening recess 212 is formed in the front surface of the second body 210 so that the inner holder fastening hook 114 formed on the first body 110 of the outer holder 100 is inserted into and fastened to the fastening recess 212.

In addition, a tube close-contact protrusion 213 protrudes from the lower surface of the second body 210 at a position at which the tube close-contact protrusion 213 and the tube seat 116 formed on the first body 110 of the outer holder 100 vertically face each other. The tube close-contact protrusion 213 is configured to be in close contact with the outer-diameter portion of a tube seated in the tube-fixing hole 112 in the first body 110, thereby regulating the seating position of the tube and to prevent movement of the tube.

Here, the process of assembling the tube-holding device according to the present disclosure will be described below in detail with reference to FIGS. 10 to 13.

First, in order to interconnect vehicle elements, two or more tubes 20, which pass through a vehicle body 30, are seated in the tube-fixing hole 112 formed in the first body 110 of the outer holder 100.

At this time, the outer holder 100 may be mounted to the vehicle body 30 in advance.

More specifically, when the first body 110 of the outer holder 100 is inserted into a mounting hole 32 formed in the vehicle body 30, the vehicle coupling hooks 113 formed on opposite side surfaces of the first body 110 are elastically compressed when passing through the mounting hole 32, and then return to the original positions thereof by elastic restoration force after passing through the mounting hole 32, whereby the vehicle coupling hooks 113 are locked with one side outer circumference of the mounting hole 32 and the vehicle-body close-contact mount 120 formed on the rim of the rear surface of the first body 110 is in close contact with the other side outer circumference of the mounting hole 32.

As the vehicle coupling hooks 113 of the first body 110 are locked with one surface of the vehicle body 30 and the vehicle-body close-contact mount 120 is in close contact with the opposite surface of the vehicle body 30, the outer holder 100 is in a state of being firmly fixed to the vehicle body 30 so as not to be moved in the front-and-rear direction (the outer holder fastening direction).

Next, the inner holder 200 is inserted into and fastened to the inner holder fastening hole 111 formed in the first body 110 of the outer holder 100.

At this time, as the sliders 211 formed on the second body 210 of the inner holder 200 are inserted into and fastened to the slide groove 115 formed in the first body 110 of the outer holder 100, straight movement of the inner holder 200 in a downward insertion direction may be ensured and the insertion depth of the inner holder 200 may be limited to the insertion depth of the sliders 211 relative to the slide groove 115.

In addition, when the second body 210 of the inner holder 200 is inserted into the inner holder fastening hole 111 formed in the first body 110 of the outer holder 100, the inner holder fastening hook 114 formed on the first body 110 is pressed by the second body 210, thereby being biased outward by the elasticity thereof. Thereafter, at the time at which the insertion of the second body 210 is completed, the inner holder fastening hook 114 is inserted into and locked in the fastening recess 212 formed in the second body 210 by the elastic restoration thereof.

When the inner holder fastening hook 114 formed on the first body 110 of the outer holder 100 is inserted into and locked in the fastening recess 212 formed in the second body 210 of the inner holder 200, the assembly of the inner holder 200 with the outer holder 100 is completed.

At this time, when the assembly of the inner holder 200 with the outer holder 100 is completed, the tube close-contact protrusion 213 formed on the second body 210 of the inner holder 200 is brought into close contact with and is pressed by the outer-diameter portion of each tube 20, which is seated in the tube-fixing hole 112 in the first body 110 in advance, thereby serving to regulate the seating position of two tubes 20 and to fix the respective tubes 20 so as to prevent movement thereof.

In this way, a tube, which extends through a vehicle body in order to interconnect various vehicle elements, may be firmly fixed in a simplified manner using the holding device including the outer holder and the inner holder, and thus, for example, movement or sagging of the tube due to vehicle driving vibrations or external forces may be easily prevented.

As is apparent from the above description, the present disclosure provides the following effects.

First, with a simplified assembly process of inserting a tube into a tube-fixing hole in an outer holder and then inserting and fastening an inner holder into the outer holder, it is possible to firmly fix the tube and to easily prevent movement of the tube.

Second, since the inner holder is fastened to the outer holder via a one-touch fastening method, holder assembly work for fixing the tube may be performed in a simplified manner, which may increase workability and productivity.

Third, fastening between the outer holder and the inner holder for fixing the tube may be performed without any limitation on the direction thereof, which may further increase assembly workability.

The invention has been described in detail with reference to embodiments thereof. However, it will be appreciated by those skilled in the art that the present disclosure may be implemented in various modifications and alterations via, for example, addition, change or omission of constituent elements without departing from the principles and spirit of the invention, and these modifications and alterations are included in the scope of the present disclosure.

In addition, in the description of the embodiments of the present disclosure, a detailed description of known functions and configurations incorporated herein is omitted when it may make the subject matter of the present disclosure rather unclear. In addition, the terms used in the above description are defined in consideration of the functions in the embodiments of the present disclosure, and may be replaced by other terms based on intensions of users or operators, customs, or the like. Hence, the meanings of these terms should be based on the whole content of this specification.

Accordingly, the above detailed description of the present disclosure is not intended to limit the present disclosure by the disclosed embodiments, and the accompanying claims should be construed as including other embodiments.

What is claimed is:

1. A vehicular tube-holding device comprising:
an outer holder configured to be mounted to a vehicle body, the outer holder having an inner holder fastening hole for insertion and fastening of an inner holder and a tube-fixing hole for passage of tubes; and
the inner holder inserted into and fastened to the inner holder fastening hole in the outer holder so as to be in contact with an outer-diameter portion of the tubes,
wherein the outer holder includes:
a first body having the inner holder fastening hole penetrating in a vertical direction at an upper portion of the first body, such that the inner holder is inserted into and fastened in the inner holder fastening hole;
vehicle body coupling hooks at opposite side surfaces of the first body; and
a vehicle-body contact mount integrally connected to a rear surface of the first body,
wherein the tube-fixing hole penetrates from a front surface to the rear surface of the first body at a lower portion of the first body, such that the tubes are capable of passing through the tube-fixing hole in a straight line,
wherein the inner holder includes a second body which has a rectangular block shape,
wherein the tube-fixing hole includes tube penetration holes communicating with each other to allow the tubes to be seated therein,
wherein in the tube-fixing hole, a tube seat protrudes upward from a middle portion of a bottom of the tube-fixing hole extending from the front surface to the rear surface thereby defining the tube penetration holes to allow the tubes to be separately seated,
wherein the second body has a tube contact protrusion protruding from a middle portion of a lower surface of the second body at a position spaced from a front surface of the second body, the tube contact protrusion and the tube seat face each other, and
wherein a lower edge of the tube contact protrusion is capable of being in contact with, and pressing, the tubes when the inner holder is fastened in the outer holder.

2. The device of claim 1, wherein the first body has an inner holder fastening hook at the front surface of the first body and protruding toward the inner holder fastening hole.

3. The device of claim 1, wherein the first body has a slide groove on an upper surface of the first body for fastening of the inner holder at a boundary between the inner holder fastening hole and the vehicle-body contact mount.

4. The device of claim 1, wherein the inner holder includes:
sliders on opposite side surfaces of the second body and inserted into a slide groove in the outer holder.

5. The device of claim 4, wherein the second body has a fastening recess on a front surface of the second body, into which an inner holder fastening hook of the outer holder is fastened.

\* \* \* \* \*